No. 804,854. PATENTED NOV. 21, 1905.
C. L. IRESON.
ART OF VULCANIZING LEATHER AND RUBBER.
APPLICATION FILED MAR. 17, 1905.

WITNESSES:
R. E. Brewer
M. V. Foley

INVENTOR:
Charles L. Ireson
by his attys
Clarke, Raymond & Cole

UNITED STATES PATENT OFFICE.

CHARLES L. IRESON, OF BOSTON, MASSACHUSETTS.

ART OF VULCANIZING LEATHER AND RUBBER.

No. 804,854.     Specification of Letters Patent.     Patented Nov. 21, 1905.

Application filed March 17, 1905. Serial No. 250,563.

*To all whom it may concern:*

Be it known that I, CHARLES L. IRESON, a citizen of the United States, and a resident of Boston, in the county of Suffolk and State of Massachusetts, have invented a new and useful Improvement in the Art of Vulcanizing Leather and Rubber, of which the following is a full, clear, and exact description, reference being had to the accompanying drawings, forming a part of this specification, in explaining its nature.

I have discovered that it is possible to unite leather and rubber by vulcanization and to by such means obtain a continuous, tenacious, and coherent union between the two substances, whereby they become substantially integral for all practical purposes. It is desirable, however, for certain methods of vulcanization and for certain kinds of leather to protect the leather during vulcanization. This in part may be secured by what is known as "dry" vulcanization, and where the leather is not protected by molds or even where it is protected to some extent by molds it is often necessary that the leather be protected from the influence of moisture, and for this purpose I inclose the leather during vulcanization to the rubber with a rubber protecting-envelop which covers all sides of the leather subjected to the moisture and serves to prevent the moisture from reaching the leather and also serves to prevent the burning of the leather.

I have illustrated this method as applied to the attachment, by vulcanization to the previously-vulcanized tire of a motor or other vehicle, of a wearing section or tread of leather.

I will now describe the invention in conjunction with the drawings forming a part of this specification, wherein—

Figure 1:
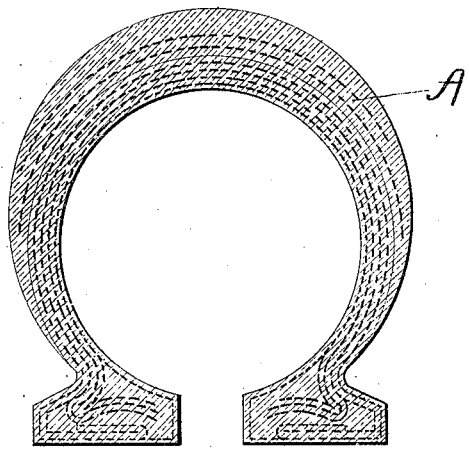
Figure 2:
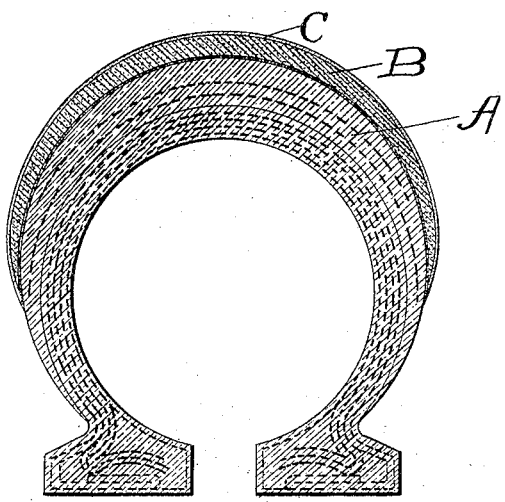

Figure 1 is a view in cross-section of a portion of a pneumatic rubber tire. Fig. 2 represents in cross-section the tire completed by having vulcanized to it a leather wearing section or tread which is covered with an envelop of rubber to protect it during the vulcanizing process.

Referring to the drawings, A shows a portion of a resilient tire of a motor or other vehicle a material portion of which is of vulcanized rubber.

B is a tread or protecting section, of leather, adapted to be united to the vulcanized rubber of the tire by vulcanization.

C is a waterproof envelop, preferably of rubber, surrounding the exposed surfaces of the leather wearing-section and by means of which the leather wearing-section is united to the previously-vulcanized rubber section of the tire by wet vulcanization at any desired heat and pressure, the rubber envelop being vulcanized, if previously unvulcanized, and serving to prevent the moisture and undue heat from reaching the leather during the vulcanizing process. It is true that this rubber envelop will become attached during vulcanization to the remainder of the tire; but this is not material, as the envelop is thin and is not released from the outer surface of the leather as the tire is used.

While I have shown my invention as applied to the manufacture of leather-covered resilient tires, I would not have it understood that it is limited to the production of such an article.

Having thus fully described my invention, I claim and desire to secure by Letters Patent of the United States—

1. The method of uniting leather to rubber comprising the coating or covering of the leather with a waterproof and heat-resisting envelop and then subjecting the leather and rubber with which it is to be united to pressure and to a moist heat in a vulcanizer.

2. As a means of protecting leather from injury during the vulcanizing process, the coating or covering of the exposed portions of the same with a waterproof, heat-resisting medium maintained about it during the vulcanizing process.

CHARLES L. IRESON.

Witnesses:
F. F. RAYMOND, 2d,
M. V. FOLEY.